Nov. 27, 1951     R. C. WITTENBERG     2,576,552
ELECTRONIC SWITCHING CIRCUIT
Filed Aug. 11, 1950
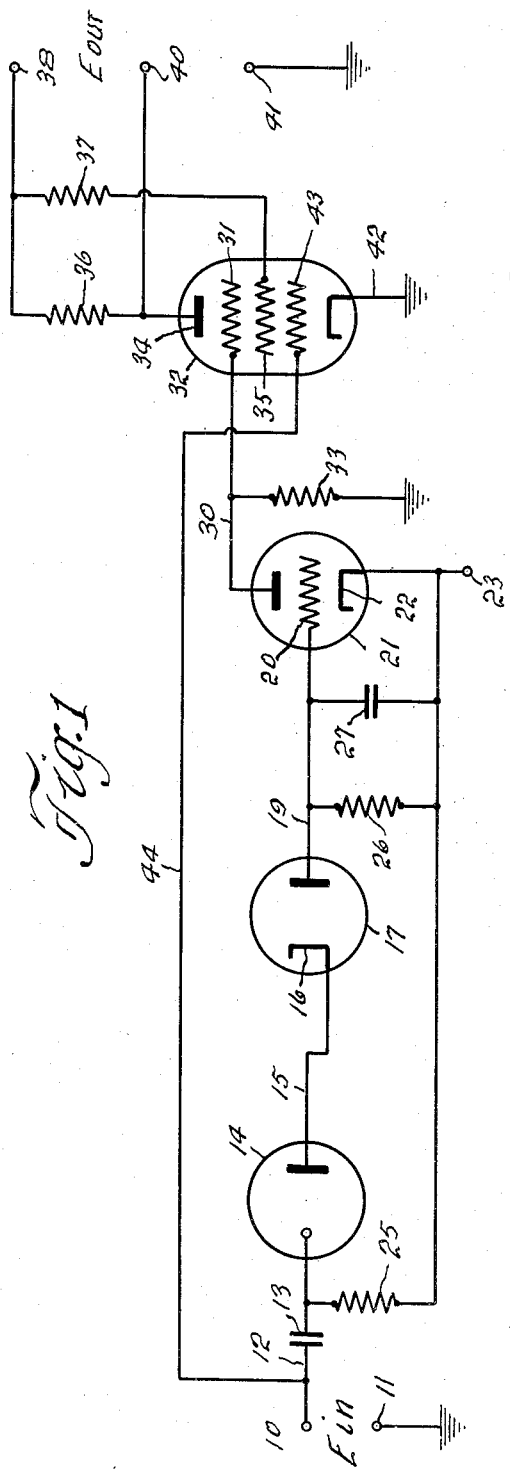
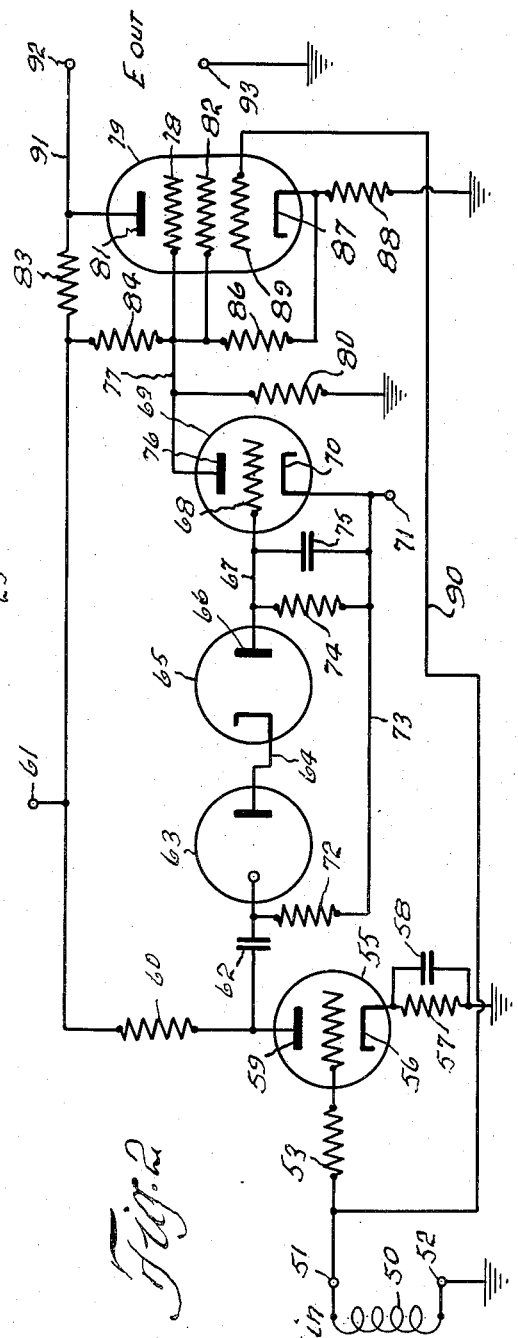
INVENTOR.
Roland C. Wittenberg
BY
Victor D. Borst
Atty.

Patented Nov. 27, 1951

2,576,552

UNITED STATES PATENT OFFICE 2,576,552

ELECTRONIC SWITCHING CIRCUIT

Roland C. Wittenberg, Mineola, N. Y., assignor to The Sperry Corporation, a corporation of Delaware Application August 11, 1950, Serial No. 178,931

5 Claims. (Cl. 250—27)

This invention relates to electronic switches and more particularly to a switching circuit suited to control the operation of a two-speed servo mechanism.

An object of the invention is to provide an electronic switching circuit of the above type in which the control signal to the servo mechanism is blocked whenever the signal falls below a predetermined value.

Another object is to provide a cut-in system of the above type in which a low noise level is maintained prior to cut-in.

The invention is particularly applicable to a two-speed servo mechanism wherein the servo is normally under the control of a fine control signal but is brought under the control of a coarse control signal whenever the coarse control signal exceeds a predetermined value. Below this value the coarse control signal is blocked by the electronic switching circuit and does not appear in the output circuit. Above that value the coarse control signal is superimposed on the fine control signal in the usual manner.

The novel features which are characteristic of this invention will be better understood by referring to the following description, taken in connection with the accompanying drawings in which certain specific embodiments have been set forth for the purpose of illustration.

In the drawings:

Fig. 1 is a schematic diagram of an electronic switching circuit embodying the present invention; and Fig. 2 is a schematic diagram of a similar circuit illustrating a further embodiment of the invention.

Referring to Fig. 1, the coarse control signal $E_{in}$ is applied across input terminals 10 and 11, the latter being grounded. The terminal 10 is connected by line 12 through condenser 13 to a gas tube 14, thence by line 15 to the cathode 16 of a rectifier 17. The anode of the rectifier 17 is connected by a lead 19 to the grid 20 of a triode 21 having a cathode 22 which is connected to suitable source of negative potential 23. A resistor 25 is connected between the junction of the condenser 13 and gas tube 14 and the source 23. A resistor 26 and condenser 27 are connected in parallel between the anode of rectifier 17 and the D. C. source 23.

The anode of the triode 21 is connected by a lead 30 to the suppressor grid 31 of a pentode 32 and is grounded through a high resistor 33. The plate 34 and screen grid 35 of the pentode 32 are connected through resistors 36 and 37, respectively, to a source of positive potential 38. The anode 34 of the pentode 32 is connected to an output terminal 40, the other output terminal 41 being grounded. The cathode of the pentode 32 is grounded by a lead 42. The control grid 43 of said pentode is connected by a lead 44 to the input terminal 10. The output voltage across the terminals 40 and 41 is the coarse control voltage to be applied to the servo mechanism.

In the operation of this system, when the input signal is less than the breakdown voltage of the gas tube 14, the grid of the triode 21 is near its cathode potential and the triode tends to draw a large plate current. If resistor 33 is large the plate voltage on the triode 21, which is also the suppressor grid voltage of the pentode 32, is at a negative potential close to the minus potential which is applied at terminal 23. This results in cutting off the pentode 32 and the output voltage is zero.

When the input voltage is larger than the break down voltage of the gas tube 14 this tube becomes conducting, the signal is rectified by the rectifier 17 and a negative bias is applied to the grid of the triode 21, thereby blocking the triode 21 and allowing the suppressor grid of the pentode 32 to return to ground potential. The pentode is then allowed to pass current and the input signal which is supplied to the control grid 43 of the pentode by the line 44 is amplified by the pentode and appears as the output signal at the output terminals 40 and 41.

The time constant of the condenser 27 and resistor 26 should be sufficient as compared to the period of the input signal so that the grid voltage of the triode 21 after cut-in is never above the tube cut-off voltage and it must be small enough so that the switching time has a negligible effect on the servo mechanism response characteristics. Condenser 13 is used as a D. C. blocking condenser and the resistor 25 provides a discharge path therefor.

It will be noted that in the above system the output voltage is equal to the input voltage times the amplification factor of the pentode 32 whenever the input voltage exceeds a value sufficient to unblock the pentode. When the input voltage is below this value the pentode remains blocked when the output signal is zero level.

Fig. 2 represents a typical circuit to be used for servo control purposes. In this figure 50 represents the secondary of the transformer carrying the input signal and connected to input terminals 11 and 52. The terminal 52 is grounded and the terminal 51 is connected through resistor 53 to the control grid of an amplifier tube 55 having a cathode 56 grounded through a resistor 57 shunted by condenser 58 and having an anode 59 connected through a resistor 60 to a source 61 of plate potential.

The anode 59 of the amplifier tube 55 is also connected through condenser 62 to a gas tube 63, thence by a lead 64 to a cathode of a rectifier tube 65 having an anode 66 which is connected by a lead 67 to the control grid 68 of a triode 69 having a cathode 70 connected to a terminal 71 which is connected to a suitable source of negative potential. The junction of the condenser 62 and the gas tube 63 is connected through a resistor 72 and by lead 73 to the cathode 70. The anode 66 of the rectifier 65 is also connected through a resistor 74 and condenser 75 in parallel to the lead 73.

The anode 76 of the triode 69 is connected by a lead 77 to the suppressor grid 78 of a pentode 79 and is grounded through a resistor 80. The anode 81 and screen grid 82 of pentode 79 are connected through resistors 83 and 84, respectively, to the source of positive potential 61. The screen grid 82 is also connected through a resistor 86 to cathode 87 of pentode 79 which is grounded through a resistor 88. The control grid 89 of pentode 79 is connected by a lead 90 to the input terminal 51. The anode 81 of the pentode 79 is connected by a lead 91 to one output terminal 92. The other output terminal 93 is grounded.

The operation of the system shown in Fig. 2 is similar to that shown in Fig. 1. In this case an amplifier tube 55 is interposed between the input signal source and the gas tube 63 so that the gas tube is caused to break down for an input signal which is less than that which, if applied directly to the gas tube 63, would cause the same to become conductive. In this system, as in Fig. 1, the triode 69 is normally conductive, and the pentode 79 is normally non-conductive due to the voltage on the suppressor grid 78 of the pentode. When an input signal is supplied from the secondary 50 of the input transformer, which after amplification by the amplifier tube 55 causes the gas tube 63 to break down, the rectified signal serves to make the grid 68 of the triode 69 sufficiently negative to cut off the tube and thereby allow the suppressor grid 78 of the pentode to assume ground potential, whereupon the pentode becomes conducting under the control of the control grid 89. The output signal thereafter is a function of the input signal as in the case of the system shown in Fig. 1.

It is obvious of course that in the system of Fig. 2 the input amplifier tube 55 could be replaced by a transformer of the proper turn ratio. However, a full wave clipping circuit may be required between the primary of the transformer and the coarse control transformer in order to limit the primary current for large values of signal voltage.

While the above described system is particularly adapted for the electronic switching of the coarse control signal of a servo control system, it is evident that the system may be adapted to various uses and that changes and modifications may be made therein as will readily appear to a person skilled in the art.

What is claimed is:

1. A system of the class described comprising an amplifier tube having an anode and a control grid, an output circuit connected to said anode, an input circuit connected to said control grid and carrying an input signal, a second input circuit carrying said input signal, said second input circuit having means developing a blocking voltage and connected to block said amplifier tube and having means responsive to said input signal when said input signal reaches a predetermined value to remove said blocking voltage.

2. A system of the class described comprising an amplifier tube having an anode and a control grid, an output circuit connected to said anode, an input circuit connected to said control grid and carrying an input signal, a second input circuit carrying said input signal, said second input circuit including a gas tube having a predetermined breakdown voltage, a rectifier tube connected in series with said gas tube and adapted to rectify the input signal when said signal exceeds said breakdown voltage, and means supplying said rectified signal to unblock said amplifier tube.

3. A system of the class described comprising an amplifier tube having an anode and a control grid, an output circuit connected to said anode, an input circuit connected to said control grid and carrying an input signal, a second input circuit carrying said input signal, said second input circuit including a normally conducting triode connected to supply a blocking voltage to said amplifier tube when the triode is conducting, a gas tube connected in the input circuit of said triode, and means connected in circuit with said gas tube to develop a blocking voltage for said triode when said input signal exceeds a value suited to break down said gas tube.

4. A control system comprising a pentode having a control grid, a suppressor grid and an anode, an output circuit connected to said anode, an input signal connected to said control grid, a second input circuit carrying said input signal and connected to said suppressor grid, means in said second input circuit normally supplying a bias to said suppressor grid suited to block said pentode and means responsive to said input signal to remove said blocking voltage.

5. A control system comprising a pentode having a control grid, a suppressor grid and an anode, an output circuit connected to said anode, an input signal connected to said control grid, a second input circuit carrying said input signal and connected to said suppressor grid, said second input circuit including a normally conducting triode having an output connected to apply a block voltage to said suppressor grid, said triode having an input circuit including a gas tube and a rectifier connected to respond to said input signal and adapted to develop a voltage for blocking said triode when said input signal exceeds the breakdown voltage of said gas tube, and thereby remove the said blocking voltage from the suppressor grid of said pentode.

ROLAND C. WITTENBERG.

REFERENCES CITED

The following references are of record in the file of this patent:

UNITED STATES PATENTS

| Number | Name | Date |
| --- | --- | --- |
| 2,425,013 | Stotz | Aug. 5, 1947 |